United States Patent
Hauck et al.

[11] Patent Number: 5,907,688
[45] Date of Patent: *May 25, 1999

[54] SMART ARBITRATION FOR NON-SYMMETRIC DATA STREAMS

[75] Inventors: Jerry Hauck, Fremont; Marla Ann Lazar, Sunnyvale, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,329

[22] Filed: Jun. 28, 1996

[51] Int. Cl.$^6$ .................................................. G06F 13/00
[52] U.S. Cl. ........................................... 395/287; 395/293
[58] Field of Search ...................................... 395/287, 293

[56] References Cited

U.S. PATENT DOCUMENTS

| | | | |
|---|---|---|---|
| 4,947,368 | 8/1990 | Donaldson et al. | 395/287 |
| 5,140,680 | 8/1992 | Best | 395/287 |
| 5,218,702 | 6/1993 | Kirtland | 395/726 |
| 5,237,696 | 8/1993 | Best | 395/287 |
| 5,371,893 | 12/1994 | Price et al. | 395/726 |
| 5,581,782 | 12/1996 | Sarangdhar et al. | 395/288 |
| 5,628,019 | 5/1997 | O'Brien | 395/326 |
| 5,655,151 | 8/1997 | Bowes et al. | 395/842 |

*Primary Examiner*—Ayaz R. Sheikh
*Assistant Examiner*—David A. Wiley
*Attorney, Agent, or Firm*—Jeffrey S. Draeger

[57] ABSTRACT

A method and apparatus for selecting a data stream in an access to a shared bus in a computer system. The method begins by requesting access to the shared bus. An evaluation of whether a first or a second data stream is a higher priority data stream is performed after the access request. The higher priority stream is selected to access the shared bus. A bus agent implementing this method includes a data stream selector coupled to receive a plurality of data streams. Bus cycle generation circuitry is coupled to a bus request line and a bus grant line. A priority evaluation circuit coupled to the data stream selector and the bus cycle generation circuitry is configured to control selection of one of the plurality of data streams based on a priority selection.

23 Claims, 5 Drawing Sheets

SMART ARBITRATION FOR NON-SYMMETRIC DATA STREAMS

FIELD OF THE INVENTION

The present invention pertains to the field of bus access prioritization in a computer system. More specifically, the present invention relates to arbitration for a shared bus between data streams of non-symmetric bandwidths.

BACKGROUND

Many powerful new features of computer systems require the addition of bus agents which compete for access to a shared bus. As bus utilization increases, management of traffic on this shared bus becomes increasingly important. If unsophisticated methods of bus arbitration govern the bus, large bus access latencies may result, thereby increasing the risk of bus agent starvation.

In order to compensate for latencies which may be experienced in attempting to access a shared bus, various bus agents often include buffers providing temporary storage. Such buffering can reduce the risk of a bus agent starving, or becoming unable to continue normal operation due to lack of access to the bus. In one case, these buffers allow the bus agent to accumulate data from an external input while waiting to write to another device on the bus. Other buffers may be used to store incoming data retrieved from the bus prior to the time at which it is required.

Multiple element data transfers requiring buffering (data streams) may thus originate from external inputs or from bus transactions. In either arrangement, a buffer may be exhausted if access to the shared bus is not granted in time. In the former case, if the entire buffer fills and is no longer able to accommodate additional data, this buffer is exhausted, and additional data causes buffer over-run. In the latter case, if the entire buffer empties and there is no reserve data for the bus agent, this buffer is also exhausted and additional requests for data cause buffer under-run.

When the buffers of a bus agent are exhausted, either data is lost or operational latencies increase. While some bus agents are able to accommodate temporary buffer exhaustion, even these agents experience an unacceptable degradation in performance from prolonged starvation. Avoiding bus agent starvation is particularly important when trying to preserve the quality of real time data capture or display.

Accordingly, bus agents are typically equipped with buffering capabilities sufficient for expected worst case access latencies. This buffering becomes expensive when high bandwidth data streams such as video signals are involved. In fact, such buffers and their associated control circuitry may constitute a large portion of a video processing chip. Buffering circuits are thus an expensive necessity, the adequacy of which depends on access latencies expected on the shared bus.

Prior art arbitration techniques typically make bus allocation decisions based on the state of the system at the time of the request. This may be inefficient for buffering data streams having different bandwidths. Because such non-symmetric data streams fill or empty their respective buffers at different rates, the relative urgency of the need to access the bus may change. By the time bus access is granted to a first requesting data stream, a second data stream may have already exhausted its buffering capability even though the first requester still has available buffers. Prior art techniques fail to take advantage of an additional optimization opportunity which could allow a reduction in the amount of buffering necessary.

In particular, some prior art systems simply grant bus access to requesting agents in the order they are received. Other prior art systems permanently ascribe different priority levels to different request signals. For example, one prior art technique uses prioritized requests such as hold or address hold signals to obtain access to the bus. In such a system one device may receive higher priority access than another; however, this priority is determined either by the particular device at the time the request is made or by the designer when the system is configured. None of these systems can advantageously use the bus access latency to re-evaluate prioritization.

The same type of arbitration inefficiency also occurs where a single bus agent has one bus access mechanism, yet several data streams to manage. If the data streams arrive in unison and have the same bandwidth (i.e. they are symmetric), intelligent arbitration may not be necessary. On the other hand, where non-symmetric channels compete for bus access, prior art arbitration may not provide an optimal solution. The prior art practice of determining access priority when the request is made may necessitate larger buffers than would more optimal arbitration.

Thus, prior art arbitration techniques do not adequately consider data stream bandwidths and bus access latencies in determining access prioritization. As a result, buffering circuitry must be able to sustain operation of bus agents for latencies which are longer than may be present if a more optimal arbitration technique is used.

SUMMARY

A method of selecting a data stream in an access to a shared bus in a computer system is described. This method begins by requesting access to the shared bus. An evaluation of whether a first or a second data stream is a higher priority data stream is performed after the access request. The higher priority stream is selected to access the shared bus.

A bus agent implementing this method includes a data stream selector coupled to receive a plurality of data streams and bus cycle generation circuitry coupled to a bus request line and a bus grant line. A priority evaluation circuit coupled to the data stream selector and the bus cycle generation circuitry is configured to control selection of one of the plurality of data streams based on a priority selection.

BRIEF DESCRIPTION OF THE FIGURES

The present invention is illustrated by way of example and not limitation in the figures of the accompanying drawings.

DETAILED DESCRIPTION

The present invention provides a method of bus arbitration for data buffers in a non-symmetric multi-function device. In the following description, numerous specific details are set forth such as particular register arrangements, data types, and data bandwidths in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

The present invention allows the minimization of the number of buffer entries required to handle two or more non-symmetric data streams. To achieve this, the invention, among other things, withholds selection of the highest priority data stream until after the bus request is made. For the highest degree of optimization, this decision may in fact be delayed until a bus grant signal is given. This technique can be advantageously applied at a system level or within a single device arbitrating between multiple data streams. The greatest opportunity for buffer savings exists where there is a large disparity between data stream bandwidths.

Figure 1:
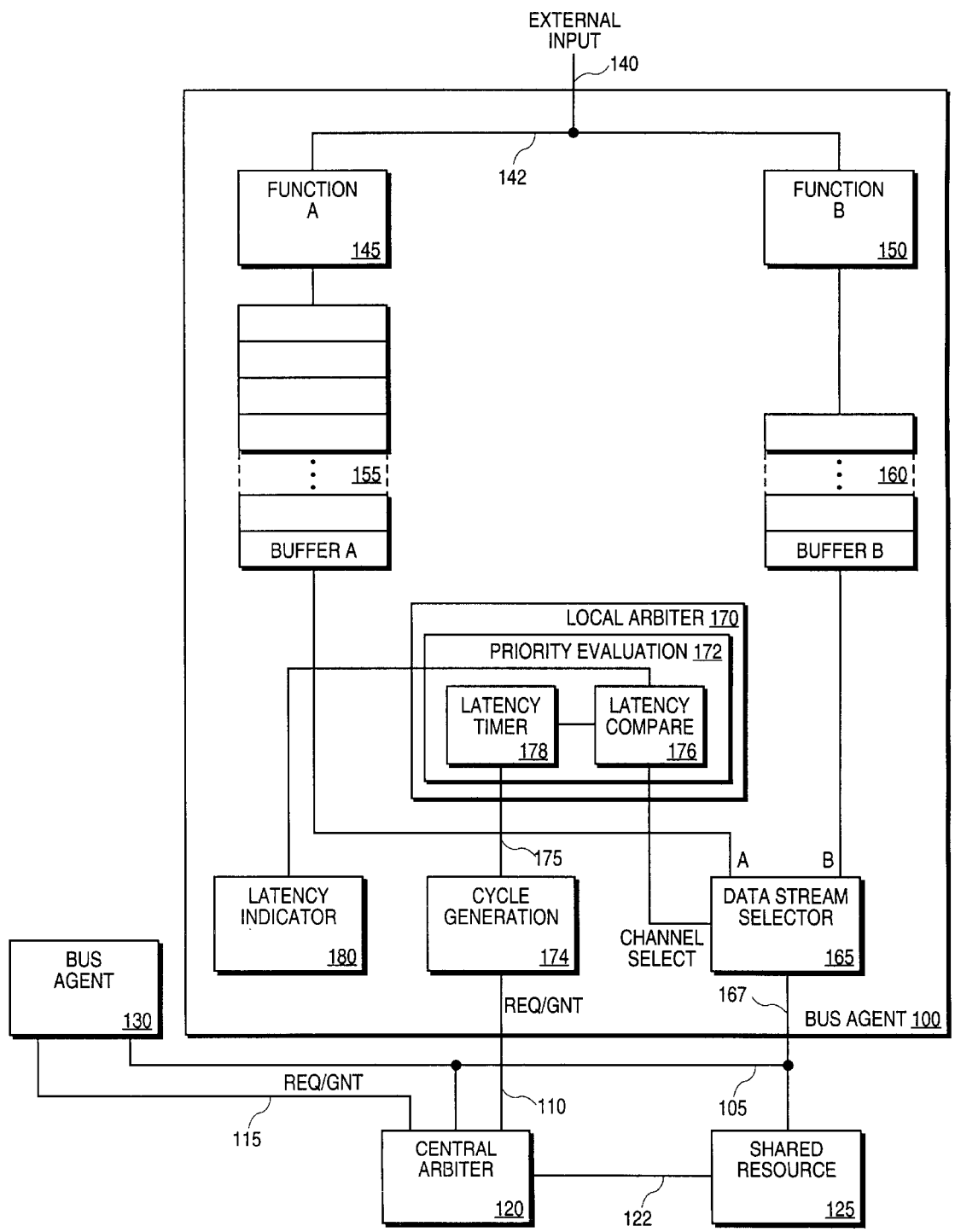
FIG. 1 is a schematic representation of a computer subsystem which includes a multi-function bus agent of the present invention.

FIG. 1 illustrates a computer subsystem having a bus agent 100 which arbitrates between data streams A and B. The bus agent 100 is a multi-function device which not only shares access to a bus 105 between its two data streams, but also competes with a second bus agent 130 for such access. Often, all data streams and bus agents concurrently request access to a shared resource 125.

Both the bus agent 100 and the bus agent 130 are coupled to the shared resource 125 by the bus 105. A central arbiter 120 is coupled to the bus 105 and coupled to the bus agent 100 by a control bus 110. The control bus 110 allows an exchange of bus request and bus grant REQ/GNT signals, typically over separate signal lines. Similarly, a control bus 115 couples the central arbiter to the bus agent 130. A shared resource control bus 122 couples the shared resource 125 to the central arbiter 120. The shared resource control bus may include bus request and bus grant signals and/or more extensive control signals such as row and column address strobe signals if the shared resource so requires.

The central arbiter 120 receives bus access requests via bus request signals from the various bus agents coupled thereto. Each requested transaction may access the shared resource 125 or any other bus agent. Any of a variety of traditional priority selection schemes may be employed by the central arbiter 120. The present invention is applicable to any system where bus requests are made to an arbiter, and some response, such as a bus grant signal, is given when access to the bus is granted.

The present invention recognizes the potential for delays between bus request and grant and allows optimization based on these access delays. For example, bus agent 130 and bus agent 100 may have both requested access to the bus 105. Assuming that the central arbiter 120 grants access to the bus agent 130, and that the bus agent 130 performs a block transfer to the shared resource 125, a significant amount of time may elapse before the bus agent 100 actually receives a bus grant signal from the central arbiter. During this time, the state of the bus agent 100 may have changed as well as the urgency of pending internal bus requests. The bus agent 100 of the present invention allows a highest priority request to be selected at the time the bus is granted.

Accordingly, the bus agent 100 includes a local arbiter 170 which properly dispatches the highest priority bus transaction when a bus grant signal is received. The local arbiter 170 is coupled to the control bus 110 to exchange bus request and bus grant signals with the central arbiter 120. The local arbiter 170 generates a bus request signal when a request is pending for either a first buffer 155 or a second buffer 160. The prioritization for access to the bus is reevaluated upon receipt of the bus grant signal by a priority evaluation circuit 172 which is configured to control the channel selection. A CHANNEL SELECT signal then controls a data stream selector 165 which chooses between data stream A and data stream B according to the final determination by the priority evaluation circuit.

The first buffer 155, BUFFER A, couples data stream A to the selector 165. The buffer 155 includes a plurality of entries or registers which each store one element or unit of data for data stream A. A first processing circuit 145, FUNCTION A, provides the data elements which fill the entries of BUFFER A. FUNCTION A receives data from an external input 140 via an internal bus 142. When all entries of BUFFER A fill with data from FUNCTION A, the buffer becomes exhausted, meaning that it has no more empty entries available for further data. At this point, subsequent data over-runs the buffer 155.

Similarly, the second buffer 160, BUFFER B, couples data stream B to the selector 165. The buffer 160 also includes a plurality of entries which store information processed by or requested by a second processing circuit 150, FUNCTION B. BUFFER B may store control information associated with data stream A; however, the invention does not require any connection between data streams A and B.

In one embodiment, the bus agent 100 uses BUFFER B to store information regarding the transfer of data from BUFFER A to the shared resource 125. The second processing circuit 150 receives signals over the internal bus 142 indicating the amount of information to be transferred from BUFFER A to the shared resource 125. This quantitative information may be determined directly from the data stream received on the external input 140 or may be provided by the first processing circuit 145 on the internal bus 142.

By request of the second processing circuit 150, the bus agent 100 then retrieves transfer information from the shared resource. BUFFER B stores the transfer information until bus cycle generation circuitry 174 in the bus agent needs this information to effectuate a transfer of data from BUFFER A to the shared resource.

Since each entry in BUFFER B provides transfer information for a limited quantity of data stored in BUFFER A, an ongoing supply of entries is required. If all of the transfer information stored in BUFFER B is used, the buffer becomes exhausted. Subsequent requests for transfer information by the bus cycle generation circuitry would result in buffer under-run.

With a given number of buffers, the present invention helps minimize the risk of these types of buffer exhaustion. When the bus grant signal is received from the central arbiter 120, the bus agent 100 determines the access latency and selects the higher bandwidth channel if a nominal latency is exceeded. Alternately, the bus agent 100 performs a final priority check whereby the priority evaluation circuit 172 selects the data stream which has the shortest remaining time before buffer exhaustion. In either case, the risk of buffer exhaustion is decreased because the final priority is calculated subsequent to the initial bus request.

This technique of post-request priority calculation is most beneficial when the bandwidth of one data stream is substantially greater than the other. If both bandwidths are the same, a simple alternating (round-robin) arbitration between the two channels should suffice. When, for example, channel A has a substantially higher bandwidth than channel B, such simple arbitration may prove inadequate. Assume that channel B makes an initial request. In the time intervening between bus request and bus grant, BUFFER A may fill dangerously close to capacity while BUFFER B has at least one entry available before exhaustion will occur. A prior art system which chooses BUFFER B due to its prior request inefficiently neglects BUFFER A which is in most urgent need of service.

A system of the present invention takes a more optimal approach which reduces the risk of buffer exhaustion. If the actual latency experienced is greater than a nominal latency, the higher bandwidth channel is chosen. In other cases, round-robin or alternating scheduling is used. While the exact savings depends on a profile of expected system latencies, the greatest buffer savings occur in a system with non-symmetric bandwidth channels where nominal access latency is much less than a worst case latency. The potential buffer savings can be illustrated given the following conditions:

FUNCTION A has a bandwidth of X

FUNCTION B has a bandwidth of Y

The nominal latency to access the bus is Tnom

The worst case expected latency is Tworst

The actual measured latency is Tact

The maximum expected consecutive times that the actual latency (Tact) is expected to exceed Tnom is n.

Tworst and Tnom are values derived from the system latency profile, whereas Tact is a measured value.

Additionally, for illustration of the advantage of the present invention, it is assumed that all data in the buffer is completely serviced once the bus has been acquired. In practice, buffer requirements may increase to account for maximum data transfer lengths; however, these calculations highlight the potential buffer savings.

With FUNCTION A and FUNCTION B implemented in separate devices, both must account for the worst case expected latency. Consequently, the buffering requirement is:

$$(X+Y)*Tworst.$$

With FUNCTION A and FUNCTION B implemented on a single device employing an arbiter which determines priority at the time of the bus request, each function can be forced to wait up to two central arbiter loops before acquiring the bus. Assuming that the worst case latency can occur two or more times in a row, the buffer requirements increase to:

$$2*(X+Y)*Tworst.$$

By determining the final priority after the external bus has been acquired and the actual latency determined, the buffer requirements are quite different. If the latency is greater than Tnom, FUNCTION A (the higher bandwidth function) is always selected. Thus, the longest FUNCTION A waits is Tworst+Tnom. Since in the worst case, n latencies greater than Tnom are expected (each of the n assumed to each be Tworst for conservative buffer design), FUNCTION B may wait up to n*Tworst+Tnom. Thus, the buffering requirements are:

FUNCTION A: X*(Tworst+Tnom)

FUNCTION B: Y*(n*Tworst+Tnom)

Total: $(X+Y*n)*Tworst+(X+Y)*Tnom$.

Savings occur when the bandwidth load is non-symmetric and the nominal latency is less than the worst case latency. More specifically, such savings result when:

Tnom<<Tworst and (n−2)*Y<X, or (n−2)*Y<<X and Tnom<Tworst.

For a system having a non-symmetric bandwidth load (X>>nY) and a nominal latency which is much less than worst case latency (Tnom<<Tworst), this embodiment represents substantial buffer savings over the prior art value of 2*(X+Y)*Tworst.

In order to achieve these gains, the priority evaluation circuit 172 provides the necessary post-request comparisons. A latency timer 178 begins timing the actual latency (Tact) when the bus agent 100 makes a bus request. The timer 178 is started when signal lines 175 couple a bus request indicator to a start input of the timer 178. Signal lines 175 also couple a bus grant indicator to an input which stops the timer 178. The actual latency may then be read from the latency timer 178.

A latency comparator 176 then compares Tact to Tnom which is provided by a latency indicator 180. If the actual latency is greater than the nominal latency, channel A (the higher bandwidth channel) is chosen. If the actual latency is less than or equal to the nominal latency, a round-robin priority selection algorithm is used.

In an alternate embodiment, the channel having the shortest remaining time before buffer exhaustion is selected. In this embodiment, first and second status circuits track remaining buffer space, and a status compare circuit utilizes channel bandwidth information to calculate the channel priority.

The bandwidth or nominal latency information may be stored in a register or hard wired into control circuitry which performs any of the above indicated operations. While a number of such details may vary between specific designs, a bus agent of the present invention ultimately provides post-request arbitration between data streams which need access to a shared bus.

Figure 2:
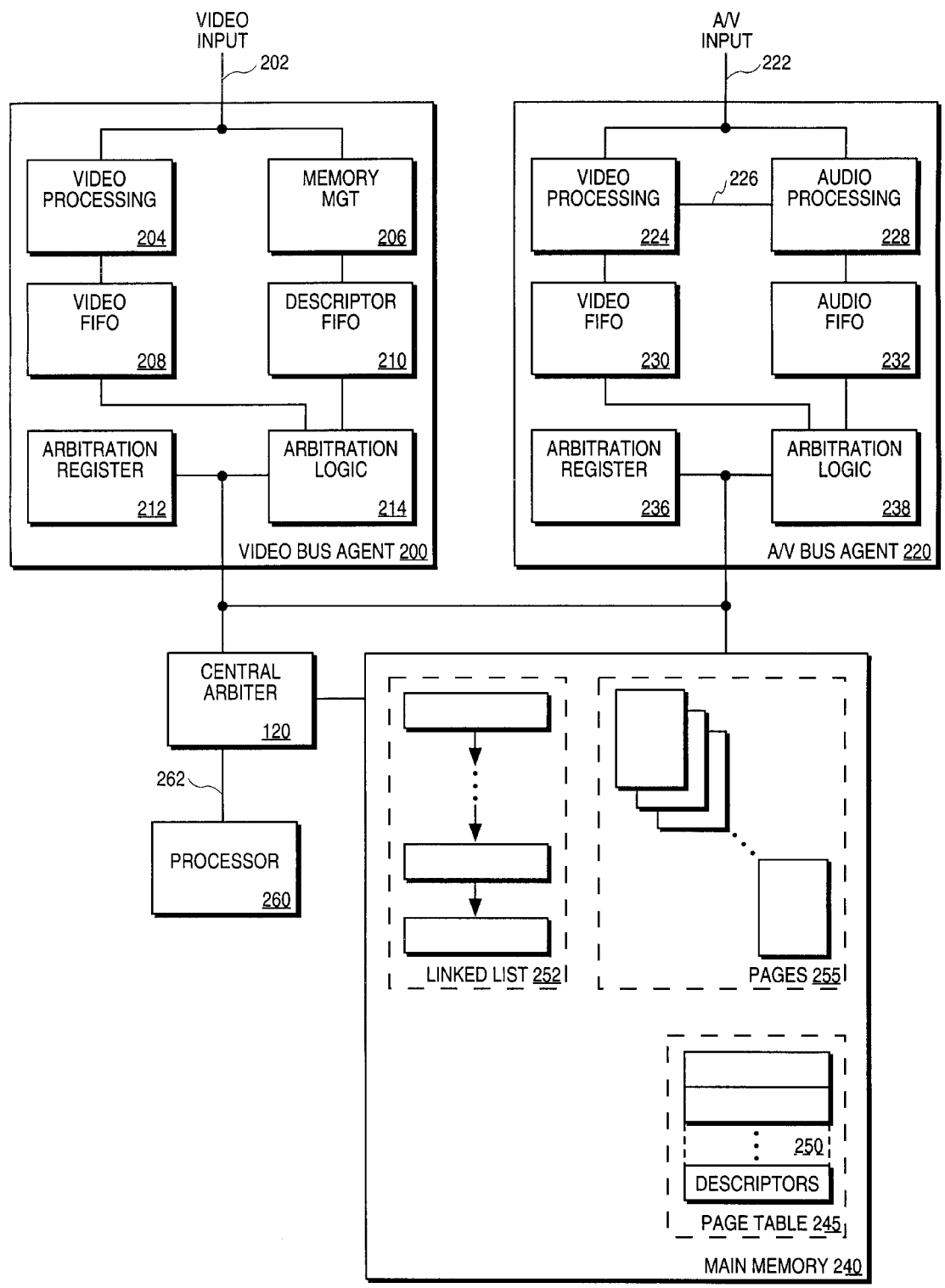
FIG. 2 illustrates a computer system utilizing two bus agents of the present invention.

FIG. 2 illustrates a computer system having several bus agent embodiments of the present invention. The computer system includes a processor 260 coupled to the central arbiter 120 by a host bus 262, and may employ any type of shared bus which provides bus grant signals to attached bus agents.

In particular, the computer system of FIG. 2 highlights two applications where smart arbitration techniques may be employed. First, a video bus agent 200 processes a video channel and a second, substantially lower bandwidth channel of page descriptors. Second, an audio/video (A/V) bus agent 220 simultaneously processes audio and video channels which also have substantially different bandwidths.

The video bus agent 200 receives video information from a video input 202. This input may include raw digital or analog signals such National Television Standards Committee (NTSC), Phase Alternation Line (PAL), or other formats. Alternately, the data may be in the form of partially processed or compressed digital data. A video processing circuit 204 translates the input data into data elements which can be stored in a first-in-first-out buffer, video FIFO 208. The video processing circuit may perform video functions such as image capture, filtering, dithering, compression, or any function which generates video data elements for the video FIFO 208.

The memory management circuit 206 assists in transferring the data received by the video FIFO 208 via a bus 225 to another resource. In this example, the video data is transferred to a main memory 240. As shown, the main memory 240 includes a plurality of pages 255 which are accessed using a page table 245 storing a plurality of page descriptors 250. Paging techniques are well known in the art, and the present invention is not limited to any particular paging system implementation.

Since limited memory resources may make burdensome the dedication of enough contiguous memory for an entire video frame, the paging system allows a virtual frame buffer to be stored in a plurality of non-contiguous pages. In one case, a linked list data structure 252 tracks successive page locations. This linked list may be included as a part of the pages which comprise the frame buffer or may be stored in a separate portion of memory.

Alternately, the appropriate descriptors for the virtual frame buffer may be stored in a dedicated or shared page table. Successive page locations may be accessed by moving through the page table entries which define the virtual frame buffer. Any traditional linked list or page table organization may be used to appropriately define a video capture buffer where the video data may be stored.

In order to accommodate the incoming video data, the video bus agent 200 determines in advance where to store incoming data. A memory management circuit 206 accomplishes this by retrieving several of the page descriptors 250 read from main memory 240 for storage in a control buffer, descriptor FIFO 210. The memory management circuit 206 may itself analyze the incoming video data or may receive signals from the video processing circuit 204 indicating how much and when storage is necessary.

In the worst case, where memory is highly fragmented, the descriptor FIFO 210 must store a descriptor for each full page of video data. In most cases, however, the virtual frame buffer includes at least some contiguous pages, potentially reducing the number of descriptors to store a given quantity of video data. With the appropriate descriptor, the video bus agent 200 can generate a bus cycle to the shared bus 225 and store the video data in the virtual frame buffer.

Thus, to adequately process incoming video data, the video bus agent requires both free entries in the video FIFO 208 and appropriate control information in the descriptor FIFO 210. The bus agent handles arbitration between these competing needs using arbitration logic 214. This arbitration logic is coupled to receive requests from the video and descriptor buffers, and is coupled to an arbitration register 212 containing either bandwidth or nominal latency information used to determine optimal prioritization which reduces the risk of exhaustion of either buffer.

The arbitration logic 214 receives a request from either the video or descriptor FIFO and accordingly generates a request signal which is coupled by the bus 225 to the central arbiter 120. Upon receipt of the bus grant signal, the arbitration circuit calculates whether the video buffer or the control buffer is the highest priority buffer. Subsequent to the receipt of a bus grant signal, the bus agent 200 couples a request to retrieve an additional page descriptor if the control buffer is the highest priority data stream. On the other hand, if the video buffer is the highest priority data stream, the bus agent 200 transfers at least one video data element to the main memory 240.

Significant savings may be realized using a smart arbitration scheme of the present invention. In one embodiment, the video processing circuit 204 performs a video capture function for an incoming NTSC signal, and the memory management circuit fetches a linked list of page descriptors. Using a YUV16 representation, a peak bandwidth of approximately 25 MB/s may be expected for the video data stream. If 32-bit page descriptors identify four kilobyte pages, a peak data rate of 18 KB/s may be expected for the control data stream.

In a computer system having an expected worst case latency (Tworst) of six microseconds, a prior art two-way arbitration scheme has a per-channel worst case latency greater than twelve microseconds. The overall buffering required for such a prior art system would be approximately 300 bytes. Assuming that the worst case latency repeats fewer than ninety times, the arbitration techniques of the present invention allow the use of only a 160 byte buffer. An impressive forty-seven percent buffer savings may be realized.

Similar buffer savings may also result where alternate data and/or control streams are used. For example, the A/V bus agent 220 buffers both video and audio data streams. This agent could also include a control data steam as discussed with respect to the video bus agent 200. Similarly to the video bus agent 200, the A/V bus agent 220 selects a highest priority channel after an original bus request is made (e.g. when the bus grant signal is returned).

In this embodiment, an arbitration circuit 238 utilizes bandwidth or latency information from an arbitration register 236 as well as status information from a video FIFO 230 and an audio FIFO 232 to select either the video or audio channel for access to the bus. Audio and video information is received via an A/V input 232 and processed by a video processing circuit 224 and/or an audio processing circuit 228. The video processing circuit may perform similar functions as does the video processing circuit 204 of the video bus agent 200. The audio processing circuit may provide analog-to-digital conversion, filtering, or other conversions/effects.

The video FIFO 230 receives video data elements from the video processing circuit 224 and the audio FIFO receives audio data elements from the audio processing circuit 228. The audio and video processing circuits can communicate synchronization and/or control information via a control bus 226. Ultimately, the audio and video FIFOs fill at different rates due to their inherently different bandwidths. Accordingly, the arbitration circuit 238 can minimize buffering requirements for these non-symmetric channels.

Figure 3:
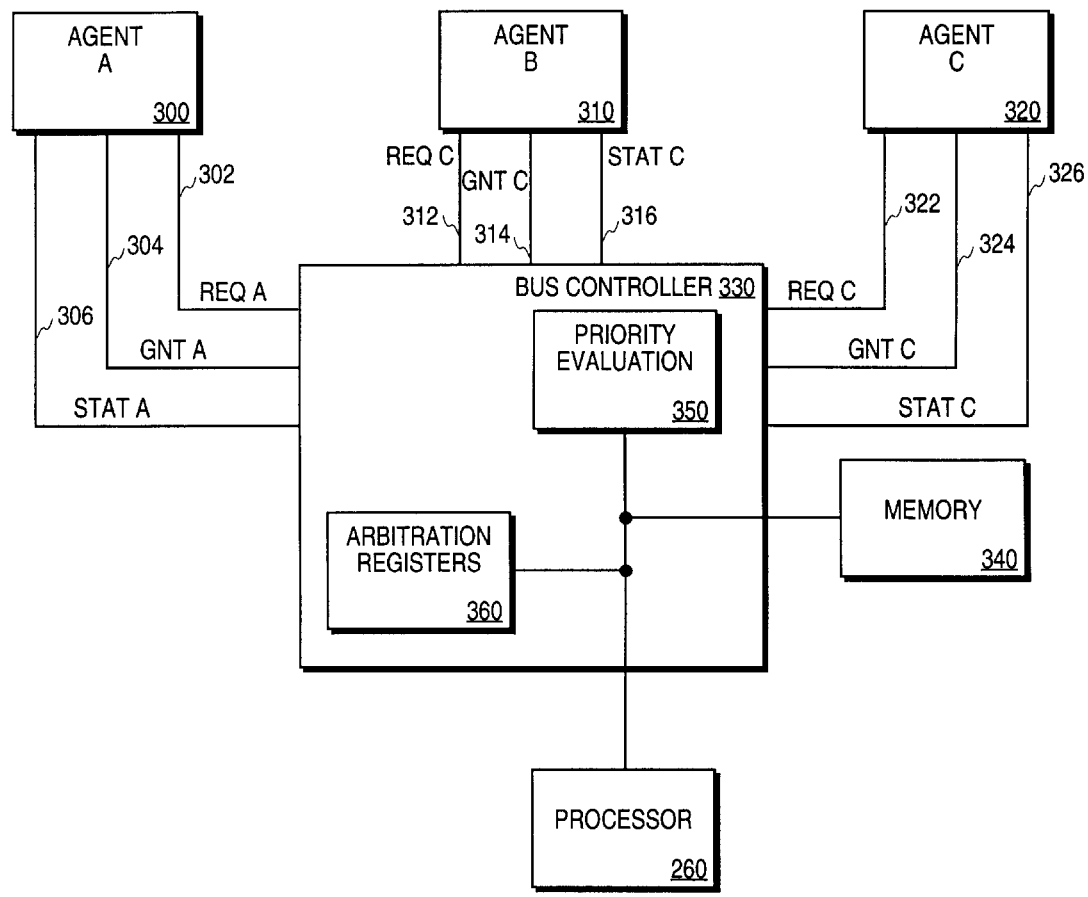
FIG. 3 illustrates a computer system which utilizes the present invention.

The present invention may not only alleviate buffering constraints at the bus agent level, but also may be employed at the system level as illustrated in FIG. 3. This computer system includes the processor 260, a memory 340, a bus controller 330, and a plurality of bus agents, AGENT A 300, AGENT B 310, and AGENT C 320. The bus controller 330 has a priority evaluation circuit 350 and a set of arbitration registers 360.

AGENT A couples a bus access request, REQ A, to the bus controller using a control line 302. The bus controller returns a GNT A signal on a second control line 304. In an embodiment which tracks remaining buffer time, status signals, STAT A, are provided on a third connection 306 between the bus controller and AGENT A. This connection provides a plurality of bits of information regarding the status of AGENT A to the bus controller. Similarly, the bus controller and AGENT B communicate via REQ B, GNT B, and STAT B signals provided over a set of signal lines 312, 314, and 316, respectively. The bus controller and AGENT C communicate via REQ C, GNT C, and STAT C signals provided over a set of signal lines 322, 324, and 326, respectively.

In one embodiment, the priority evaluation circuit 350 includes at least one timer tracking the latencies for the various bus agents. The nominal latency as well as bandwidth information stored in the arbitration registers 360 indicates which channel has the highest bandwidth as well as the expected nominal latency. The priority evaluation circuit utilizes round-robin scheduling until the nominal latency is exceeded, at which point the highest bandwidth channel is selected.

In the alternate embodiment where remaining buffer time is tracked, each bus agent requests bus access and informs the bus controller of its status. The priority evaluation circuit 350 determines which bus agent has the most urgent need to access the bus. In one embodiment, the priority evaluation circuit relies on the individual bus agents to continuously update status information while a request is pending. This status information from each of the bus agents may be scaled by the bus agent according to its bandwidth requirements, or may be adjusted according to the bandwidth registers by the bus controller.

In another embodiment, each bus agent provides with each bus request an initial status indicating a remaining time or a remaining quantity of buffers. The priority evaluation circuit then tracks the urgency by re-calculating the remaining time for each bus agent using the expected bus agent bandwidth and the amount of time which elapses from the initial request. Some bus agents which may not continuously receive incoming data may provide an additional status indicator so that the bus controller does not unnecessarily elevate their priority when data is not being received.

Figure 4:
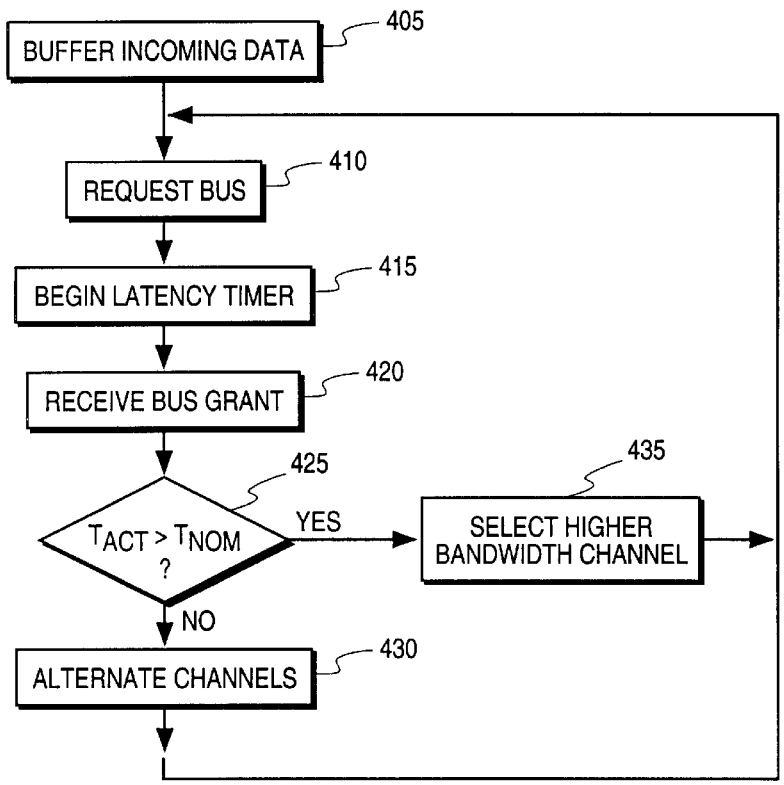
FIG. 4 is a flow diagram which illustrates a method of the present invention.

Thus the present invention may be practiced using individual bus agents or at a system level. FIG. 4 illustrates one appropriate method which is generally applicable to either structural configuration. In step 405, incoming data is buffered. A request for bus access is subsequently issued in step 410. When this bus request is made, a latency timer is started as is illustrated in step 415. The latency timer is halted in step 420 when a bus grant signal is received indicating that the bus access has been granted, and the actual latency (Tact) is now stored in the timer.

A priority evaluation is performed in step 425 by comparing the actual latency to the nominal latency. As previously discussed, this nominal latency is a value determined in advance from an expected system latency distribution. If the actual latency is less than or equal to the nominal latency, a round-robin (alternating) scheduling algorithm is maintained as shown in step 430.

If the actual latency is greater than the nominal latency, the danger increases that the higher bandwidth channel will over-run its buffering capacity. Accordingly, the higher bandwidth channel is favored in an environment where waiting is above normal as shown in step 435. In a system where the bandwidth disparity is large or the nominal latency is much less than the worst case latency, this technique decreases the overall buffering requirements.

Figure 5:
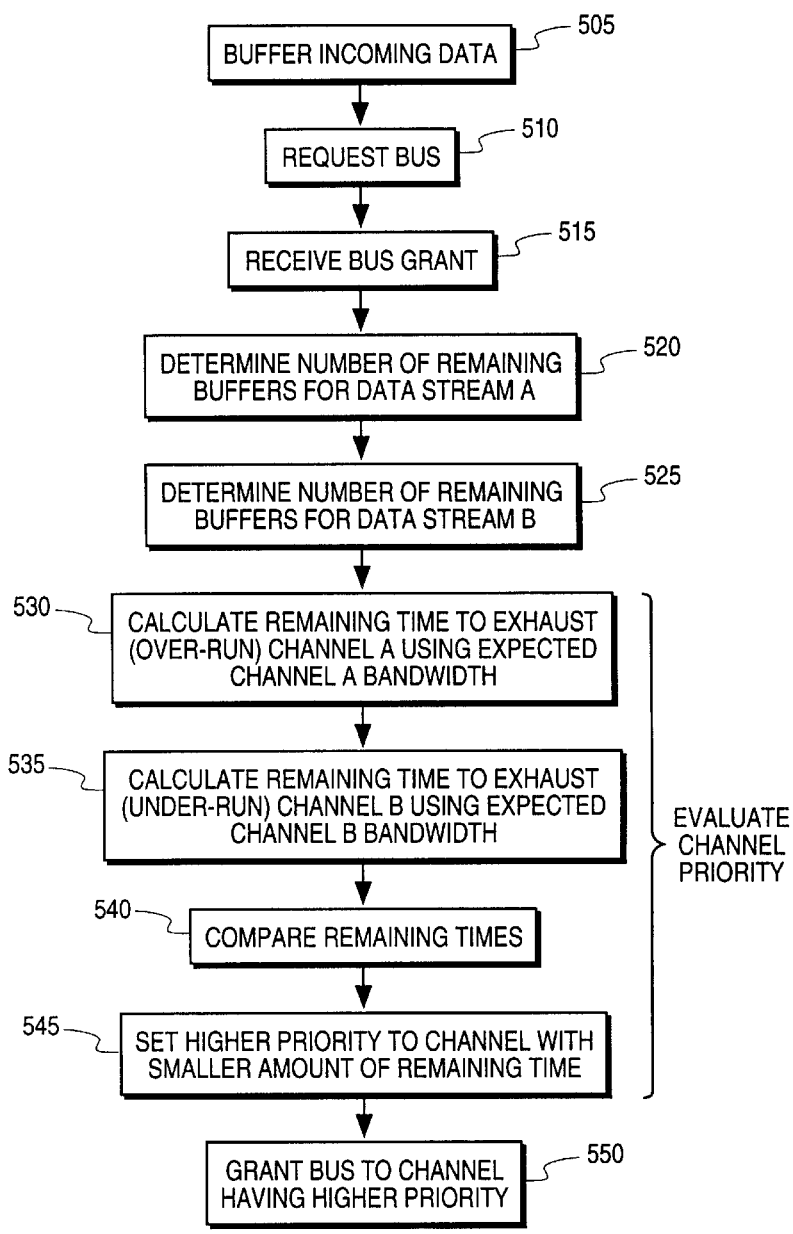
FIG. 5 is a flow diagram which illustrates an alternate method of the present invention.

FIG. 5 illustrates an alternate method which selects the data stream having the least remaining time. In step 505, the incoming data, "STREAM A" and "STREAM B", the data streams response to one or both of the data streams requiring service via a shared bus, bus access is requested in step 510. After a latency which depends on other devices accessing the shared bus, A controller responds, and a bus grant signal is received in step 515.

The request being granted, it can be determined which data stream has the least remaining time before buffer exhaustion and therefore deserves the highest priority. The number of remaining buffers for data stream A is determined in step 520. This may be determined using a pointer indicating either the present number of full or empty buffers. Similarly, the number of remaining buffers for data stream B is determined in step 525.

After this assessment of the buffer status, the channel priority is evaluated. In step 530, the amount of time remaining before buffer exhaustion for channel A is calculated using the expected bandwidth for channel A. Similarly, step 535 illustrates the calculation of the remaining time before the channel B buffering is exhausted. As in step 535, the expected bandwidth is used along with the number of remaining buffers previously determined. These remaining times are then compared in step 540.

In an alternate embodiment, the priority could be determined without calculating separate values for both data streams as shown in steps 520 and 525. A relative bandwidth factor may be used to appropriately weight one of two indicators of the number of remaining buffers. Thus, a single operation may determine the priority.

After the appropriate comparison is complete, the channel with the smaller amount of remaining time is designated the highest priority channel in step 545. Access to the bus is then granted to the highest priority channel in step 550.

In an alternate method, the calculation of the highest priority channel need not be forestalled until a bus grant signal is received. In this case, the calculation of the highest priority channel may be repeated each bus cycle, and a bus cycle may be executed without recalculation when the bus grant signal is received. This approach is also adequately suited to any of the hardware configurations previously described.

Thus, the method and apparatus of the present invention provides for smart arbitration of non-symmetric data streams in a variety of contexts. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method of selecting a data stream in an access to a shared bus in a computer system, the method comprising the steps of:

(a) requesting access to the shared bus to transmit data over the shared bus;

(b) receiving a request grant signal granting access to transmit data over the shared bus;

(c) determining which of either a first data stream or a second data stream is a higher priority data stream, the determining step occurring after the receiving step; and (d) selecting the higher priority data stream to access the shared bus.

2. The method of claim 1 wherein step (c) further comprises the step of:

(i) comparing an actual latency to a nominal latency.

3. The method of claim 3 wherein the first data stream is a higher bandwidth data stream, and wherein step (d) further comprises the steps of:

(i) selecting the higher bandwidth data stream if the actual latency is greater than the nominal latency; and (ii) alternating between the first data stream and the second data stream if the actual latency is less than the nominal latency.

4. The method of claim 3 wherein step (a) further comprises the step of:

(i) starting a latency timer.

5. The method of claim 1 wherein the first data stream has a first expected bandwidth and the second data stream has a second expected bandwidth which is substantially less than the first expected bandwidth, and wherein the step of determining further comprises the step of:

(i) comparing the first expected bandwidth and a first number of registers remaining for the first data stream to the second expected bandwidth and a second number of registers remaining for the second data stream.

6. The method of claim 1 wherein the first data stream is an incoming data stream and the second data stream is a control stream, and wherein the step of determining further comprises the steps of:

(i) determining a number of empty entries remaining in a first buffer for the incoming data stream;

(ii) determining a number of full entries remaining in a second buffer for the control stream;

(iii) calculating a first duration after which the incoming data stream will over-run the empty entries remaining for the incoming data stream;

(iv) calculating a second duration after which the control stream will under-run the full entries remaining for the control stream;

(v) selecting the data stream corresponding to the shorter of the first and the second durations as the higher priority data stream.

7. A method of selecting a data stream to access a bus from a first data stream and a second data stream, the first data stream having a substantially higher bandwidth than the second data stream, the method comprising the steps of:

(a) requesting access to transmit data over the bus using a bus request signal;

(b) tracking with a timer an actual access latency until access to transmit data over the bus is granted;

(c) comparing the actual access latency to a nominal latency;

(d) selecting the first data stream if the actual access latency is greater than the nominal latency; and (e) alternating between the first and the second data streams if the actual access latency is not greater than the nominal latency.

8. A bus agent comprising:

a data stream selector coupled to receive a plurality of data streams;

bus cycle generation circuitry coupled to a bus request signal line and a bus grant signal line;

a priority evaluation circuit coupled to the data stream selector and the bus cycle generation circuitry and which makes a priority selection from the plurality of data streams after a bus request signal requesting access to transmit data on the bus is generated on the bus request signal line.

9. The bus agent of claim 8 wherein the priority evaluation circuit comprises:

a latency timer having a start input coupled to receive a bus request indicator from the bus cycle generation circuitry and having a stop input coupled to the bus grant signal line; and a latency comparator coupled to the latency timer, coupled to a nominal latency indicator, and controllingly coupled to the data stream selector.

10. The bus agent of claim 9 further comprising:

a plurality of buffers coupled to provide the plurality of data streams to the data stream selector.

11. The bus agent of claim 10 wherein the latency timer begins timing an actual latency when the bus request indicator is received, the latency comparator compares the actual latency to a nominal latency from the nominal latency indicator, and wherein the data stream selector selects a highest bandwidth data stream if the actual latency is greater than the nominal latency.

12. The bus agent of claim 11 wherein the data stream selector alternates between the plurality of data streams if the actual latency is not greater than the nominal latency.

13. A bus agent in a computer system, the bus agent comprising:

a first buffer coupled to buffer data for a first data stream, the first buffer having a first remaining time before the first data stream exhausts the first buffer;

a second buffer coupled to buffer data for a second data stream, the second buffer having a second remaining time before the second data stream exhausts the second buffer;

an arbitration circuit, coupled to the first buffer and the second buffer, the arbitration circuit granting access to a computer system bus to either the first buffer or the second buffer when a bus grant signal which grants access to transmit data over the computer system bus is received, depending on whether the first remaining time or the second remaining time is a smaller remaining time at the time the bus grant signal is received.

14. The bus agent of claim 13 wherein the first buffer is a first-in-first-out buffer (FIFO), the first data stream is video data, the second buffer is a second FIFO, and the second data stream comprises a plurality of descriptors which describe a linked list for storing the video data in a memory.

15. The bus agent of claim 14 wherein the first buffer is substantially larger than the second buffer and the first data stream has a substantially larger bandwidth than the second data stream.

16. A computer system comprising:

a central bus arbiter coupled to control a shared bus, coupled to receive a bus request signal to request access to the shared bus to transmit data, and coupled to generate a bus grant signal;

a processor coupled to the central bus arbiter;

a main memory coupled to the central bus arbiter and the shared bus;

a bus agent which generates the bus request signal and receives the bus grant signal, the bus agent comprising:

a data selector coupled to select from a plurality of data streams, one of the plurality of data streams being a higher bandwidth data stream than the other data streams; and a priority evaluation circuit coupled to the data selector and the bus cycle generation circuit and which makes a priority selection from the plurality of data streams after the bus request signal is generated.

17. The computer system of claim 16 wherein the priority evaluation circuit comprises:

a latency timer coupled to track an actual latency between the bus request signal and the bus grant signal; and a latency comparator coupled to compare the actual latency to a nominal latency, the latency comparator being controllingly coupled to the data selector.

18. The computer system of claim 17 wherein the data stream selector selects the higher bandwidth data stream if the actual latency is greater than the nominal latency.

19. The bus agent of claim 18 wherein the data stream selector alternates between the plurality of data streams if the actual latency is not greater than the nominal latency.

20. The computer system of claim 19 wherein the bus agent further comprises:

a plurality of buffers coupling the plurality of data streams to the data selector.

21. A computer system comprising:

a central bus arbiter coupled to control a shared bus, coupled to receive a bus request signal, and coupled to generate a bus grant signal;

a processor coupled to the central bus arbiter;

a main memory coupled to the central bus arbiter and the shared bus the main memory containing a plurality of pages and a plurality of page descriptors;

a bus agent which generates the bus request signal and receives the bus grant signal, the bus agent receiving data from a video capture input and comprising:

a data selector coupled to select from a plurality of data streams, one of the plurality of data streams being a higher bandwidth data stream than the other data streams, the data stream selector selecting the higher bandwidth data stream if the actual latency is greater than the nominal latency and alternating between the plurality of data streams if the actual latency is not greater than the nominal latency;

a plurality of buffers coupling the plurality of data streams to the data selector, the plurality of buffers comprising:

a video buffer which contains a plurality of video data elements received from the video capture input; and a control buffer which contains a subset of the plurality of page descriptors, the subset defining a virtual frame buffer;

a priority evaluation circuit coupled to the data selector and the bus cycle generation circuit and configured to control selection of one of the plurality of data streams based on a priority selection, the priority evaluation circuit comprising:

a latency timer coupled to track an actual latency between the bus request signal and the bus grant signal; and a latency comparator coupled to compare the actual latency to a nominal latency, the latency comparator being controllingly coupled to the data selector.

22. A computer system having a bus, the computer system comprising:

a plurality of bus agents coupled to generate a plurality of bus request signals and a plurality of data stream status indicators, each of the plurality of bus agents being coupled to receive one of a plurality of bus grant signals each indicating that a respective bus agent can access the bus;

a bus controller coupled to receive the plurality of bus request signals and the plurality of data stream status indicators, the bus controller providing a bus grant signal to allow to one of the plurality of bus agents which has a data stream status indicating a highest priority at the time the grant signal is generated to transmit data over the bus.

23. The computer system of claim 22 wherein the bus controller further comprises:

a plurality of bandwidth indication registers containing a plurality of bandwidth indication values;

a priority evaluation circuit which calculates the highest priority by comparing the plurality of data stream status indicators using the plurality of bandwidth indication values.

* * * * *

UNITED STATES PATENT AND TRADEMARK OFFICE
CERTIFICATE OF CORRECTION

PATENT NO. : 5,907,688
DATED : May 25, 1999
INVENTOR(S) : Hauck et al.

It is certified that error appears in the above-identified patent and that said Letters Patent is hereby corrected as shown below:

Column 9,
Line 54, delete "the data streams" and insert -- is buffered. In --.

Signed and Sealed this

Tenth Day of January, 2006

JON W. DUDAS
*Director of the United States Patent and Trademark Office*